May 24, 1932. J. W. BUNCH 1,860,136
LIQUID SPREADING APPARATUS
Filed April 2, 1928
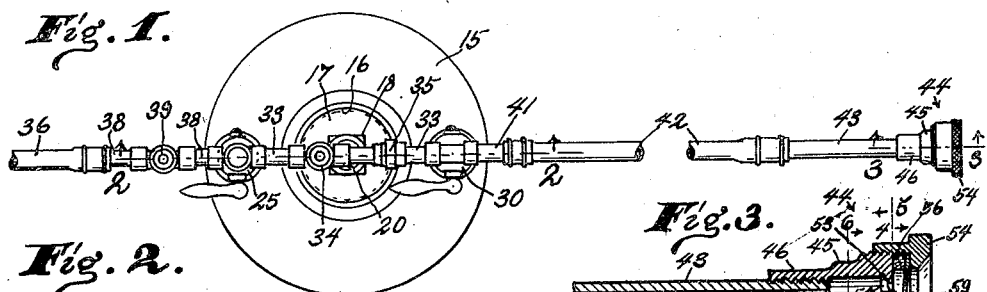
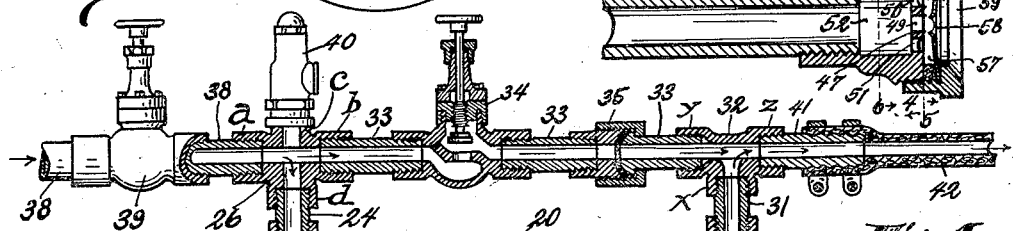
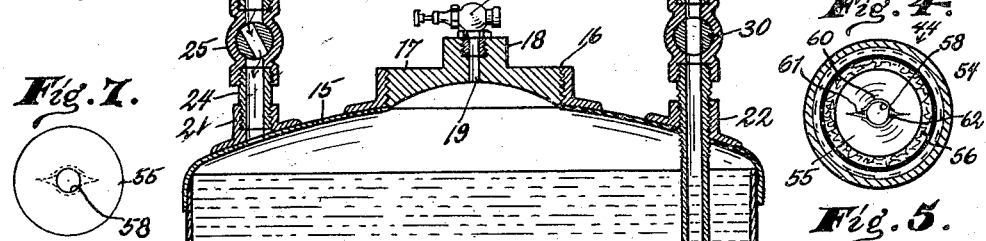
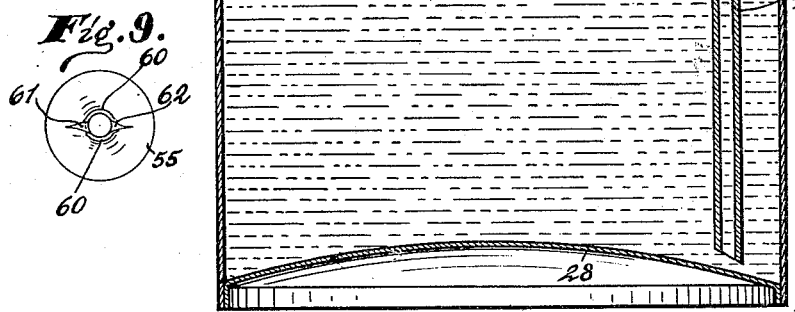
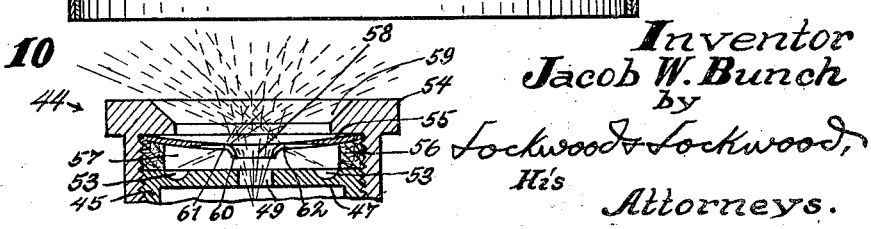
Inventor
Jacob W. Bunch
by
Lockwood & Lockwood,
His Attorneys.

Patented May 24, 1932

1,860,136

UNITED STATES PATENT OFFICE

JACOB W. BUNCH, OF LOS ANGELES, CALIFORNIA, ASSIGNOR OF ONE-HALF TO JOHN C. BOWMAN, OF LOS ANGELES, CALIFORNIA

LIQUID SPREADING APPARATUS

Application filed April 2, 1928. Serial No. 266,712.

This invention relates to means for spreading liquids for various purposes, such as painting, or use with calcimine, whitewash, asphaltum, and the like, and an object of the invention is to provide a simple apparatus that is as effective in spreading heavy as well as light flowing liquids.

To that end I provide liquid spreading apparatus that can be connected by an air line either directly to an air compressor or compressed air tank with means including valves connected to the top of the apparatus for discharging all of the air into the tank on the top surface of the liquid to drive it from the tank unmixed with air, with the valves arranged so that if desired the compressed air can be divided so that part of it is directed into the liquid tank to drive out the liquid and the other part of the air directed across the path of the discharged liquid toward a nozzle to spread the liquid, or if desired the valves can be manipulated to drive clean air through the spreader nozzle to first clean a surface of dust and the like, and then the valves can be readjusted to drive pure paint or asphaltum through the nozzle to paint the surface with a material that does not contain air bubbles.

Another object of the invention is to provide a liquid spreading apparatus having means for controlling and regulating the flow of compressed air into the apparatus, and also controlling and regulating the flow of air to the liquid tank as well as to the nozzle so that proper adjustments can be easily and quickly made for operating with liquids of different density.

In other words a greater pressure of air in both the tank and nozzle is required for discharging and spreading heavy liquids having a tendency to coagulate and solidify than thin liquids. Consequently I provide a simple means for increasing or decreasing the pressure according to the consistency of the liquid being sprayed or spread.

Another object is to provide the apparatus with a nozzle adapted to spread the liquid in a relatively even coat over a surface up to its marginal edge without excessive waste of material.

Features of invention are shown in the construction, combination and arrangement of the parts whereby a liquid spraying apparatus is provided that is easy to construct, assemble and operate, neat and pleasing in appearance and effective and durable in use.

Other objects, advantages and features of invention may appear from the accompanying drawings, the subjoined detailed description and the appended claim.

The accompanying drawings illustrate the invention:

Figure 1 is a plan view of a liquid spraying apparatus constructed in accordance with this invention, showing the compressed air pipe broken away and also showing a fragmental portion of the hose connection between the apparatus and spray nozzle.

Fig. 2 is an enlarged fragmental central vertical section on line 2—2, Fig. 1, showing a detail of the means for controlling the flow of compressed air and liquid.

Fig. 3 is an enlarged fragmental section through the spreader nozzle, showing the disk constructed to spread the liquid in a fan-shaped spray.

Fig. 4 is a cross section on line 4—4, Fig. 3, showing the convexed side of the spray disk and the form of the orifice therethrough for discharging the liquid in a fan-shaped spray.

Fig. 5 is another cross section through the nozzle on line 5—5 showing the arrangement of the discharge outlets through the cross or transverse wall at the end of the nozzle head.

Fig. 6 is another cross section on line 6—6, Fig. 3, showing the opposite side of the transverse wall of the head.

Fig. 7 is a view of the disk detached from the nozzle showing its concave side.

Fig. 8 is an edge view of the disk.

Fig. 9 is a view of the convexed side of the disk.

Fig. 10 is an enlarged central section of the end of the nozzle that appears at the right hand end of Fig. 3.

The apparatus includes a tank 15 that is adapted to resist high pressure, and it has a top inlet 16 that is of relatively large size so that the tank can be easily filled with heavy or slow flowing liquids such as paints, asphaltum and the like.

The inlet 16 is normally closed by a crown plug 17 that is provided with a squared wrench-hold 18 by which the plug can be attached to or detached from the tank.

This plug is provided with a vent 19 that is normally closed by an air cock 20 that can be opened to admit air into the tank when necessary.

Internally threaded bosses 21, 22 are oppositely arranged on the top plate 15 of the tank, and these bosses support the means for driving the liquid out of the tank and spreading it.

A standpipe 24 having an air valve 25 therein has its lower end secured in the boss 21 and the upper end of the pipe is secured to a four-way pipe fitting 26 having arms $a$, $b$, $c$ and $d$.

A discharge pipe 27 is adjustable through the boss 22 and has its inlet end arranged adjacent the bottom plate 28 of the tank so that when in use substantially all of the liquid 29 can be discharged from the tank without the liquid being mixed with air unless such mixture is desired.

A valve 30 is secured to the upper end of the pipe 27; and also connected by a short pipe 31 to a three-way pipe fitting 32 having arms $x$, $y$, $z$.

The pipe 27 is adjustable so that the pipe fitting 32 can be raised or lowered to aline the exact centers of the arms $y$—$z$ with the exact centers of the arms $a$—$b$ of the fitting 26.

The arm $b$ is connected to the arm $y$ by a pipe 33 that has a globe valve 34 that is normally closed except when the apparatus is used for spraying; and also interposed in the pipe 33 is a coupling 35.

A flexible air supply pipe 36 has its discharge end connected to the arm $a$ of the fitting 26 by a pipe 38 in which a globe valve 39 is interposed.

The pipe 36 can have its inlet end connected to an air compressor or storage tank not shown, as they are old and well understood in the art.

A safety valve 40 of common type is secured to the arm $c$ of the fitting 26 so that when the pipe 27 becomes choked by slow flowing material such as asphaltum or paint and the pressure becomes excessive in the tank or pipe connection the compressed air can escape through the safety valve.

A pipe 41 has one end secured to the arm $z$ of the fitting 32, and the other end of this pipe is secured to the inlet end of a flexible hose 42.

The outlet end of the hose 42 is secured to a pipe handle 43 to which the nozzle 44 is secured. The nozzle 44 includes a hollow head 45 with a neck 46 secured to the pipe handle 43.

An end or cross wall 47 is arranged at the discharge end of the head and has therethrough a center orifice 49 and oppositely arranged obliquely inclined passages 50, 51 leading from a chamber 52 in the head. The passages 50, 51 enter an annular channel 53 in the wall 47.

A screw cap 54 is detachably secured to the head 45 so as to hold a disk 55 in place which is spaced away from the end wall 47 by a fiber washer 56 to form a circulating chamber 57 between the wall and the disk so that liquid discharging through the inclined passages into the annular channel 53 will cause rapid circulation of the liquid in the chamber that will aid greatly in causing an even fan-shaped spread of the liquid as it discharges through an orifice 58 in the disk 55. The disk 55 is arranged with its convex side adjacent the wall 45 and with its concave side exposed through the opening 59 in the cap 54.

The rim 60 around the orifice 58 is slightly extended toward the wall 47 and oppositely arranged are slotted passages 61, 62 that are cut into the rim 60 that aid in causing the liquid passing through the orifice 58 and slotted passages 61, 62 to discharge in a fan-shaped spray so that surfaces of walls, streets and pavements can be painted up to their marginal edges without an excessive waste of material.

When the position of the disk 55 is reversed a straight stream will discharge from the nozzle.

In operation the tank 15 is filled with liquid as described. Then with valve 34 closed the valves 25, 30 are adjusted to a proper open position for operation. Then when desiring to spread liquids such as paint or asphaltum free from air bubbles the valve 39 is opened to admit compressed air to the tank where pressure on the top surface of the liquid will cause it to discharge from the nozzle in an even fan-shaped spread free from air bubbles. The spread of the liquid as discharged from the nozzle is of wide extent so that extensive surfaces can be quickly and evenly painted in a relatively short time. The pipe 24 forming a branch to the tank 15 and the pipe 33 forming another branch to the nozzle 44 so that if desired the apparatus can be used to spread liquid mixed with air. In other words the compressed air can be separated in the fitting 26, part of it going to the tank to cause pressure on the liquid, and the other part going to the nozzle to discharge the liquid in a fan-shaped spray.

Thick or slow flowing liquids such as paint, varnish and asphaltum require a greater pressure to discharge them from the tank than thin liquids, and a provision is made through adjustment of the valves 25, 34 to effect a discharge of such liquid from the tank without being saturated with air. In other words when the valves 25 and 30 are open, and the valve 34 is closed, the full pressure of the air will be on the top surface of the liquid to force it out of the tank through the discharge pipe 27 unsaturated with air so that when spread there are no air bubbles in the coating.

I claim as my invention:

In a liquid spreading apparatus the combination with a tank having an inlet arranged centrally in its upper end through which said tank can be filled with liquid, a screw plug for normally closing said inlet, an air cock for normally closing a vent through said plug for manually releasing air or gas pressure in said tank, of means for discharging air either into the tank or over the discharge end of a siphon pipe to discharge the liquid from said tank, said means including a stand-pipe supported vertically on the upper end of said tank and arranged oppositely to a siphon pipe extending down through said tank to near the bottom thereof, valves interposed in the stand and siphon pipes, a four-way pipe fitting on the upper end of said stand-pipe, a safety valve on the uppermost arm of said four-way pipe fitting for automatically relieving excessive air or gas pressure in said tank, an inlet pipe connected to one of the arms of said four-way pipe fitting, a control valve in said inlet pipe, a three-way pipe fitting connected to the upper end of said siphon pipe, a discharge pipe secured to one of the arms of said three-way fitting, a pipe connection between said pipe fittings, and a valve interposed in said pipe connection whereby said valves can be opened and closed to siphon the liquid from the tank so it will be saturated with air or force the liquid from the tank unmixed with air substantially as described.

In witness whereof, I have hereunto affixed my signature.

JACOB W. BUNCH.